No. 639,080. Patented Dec. 12, 1899.
W. L. MORRIS.
CARTRIDGE LOADING MACHINE.
(Application filed Jan. 23, 1899.)
(No Model.) 17 Sheets—Sheet 1.
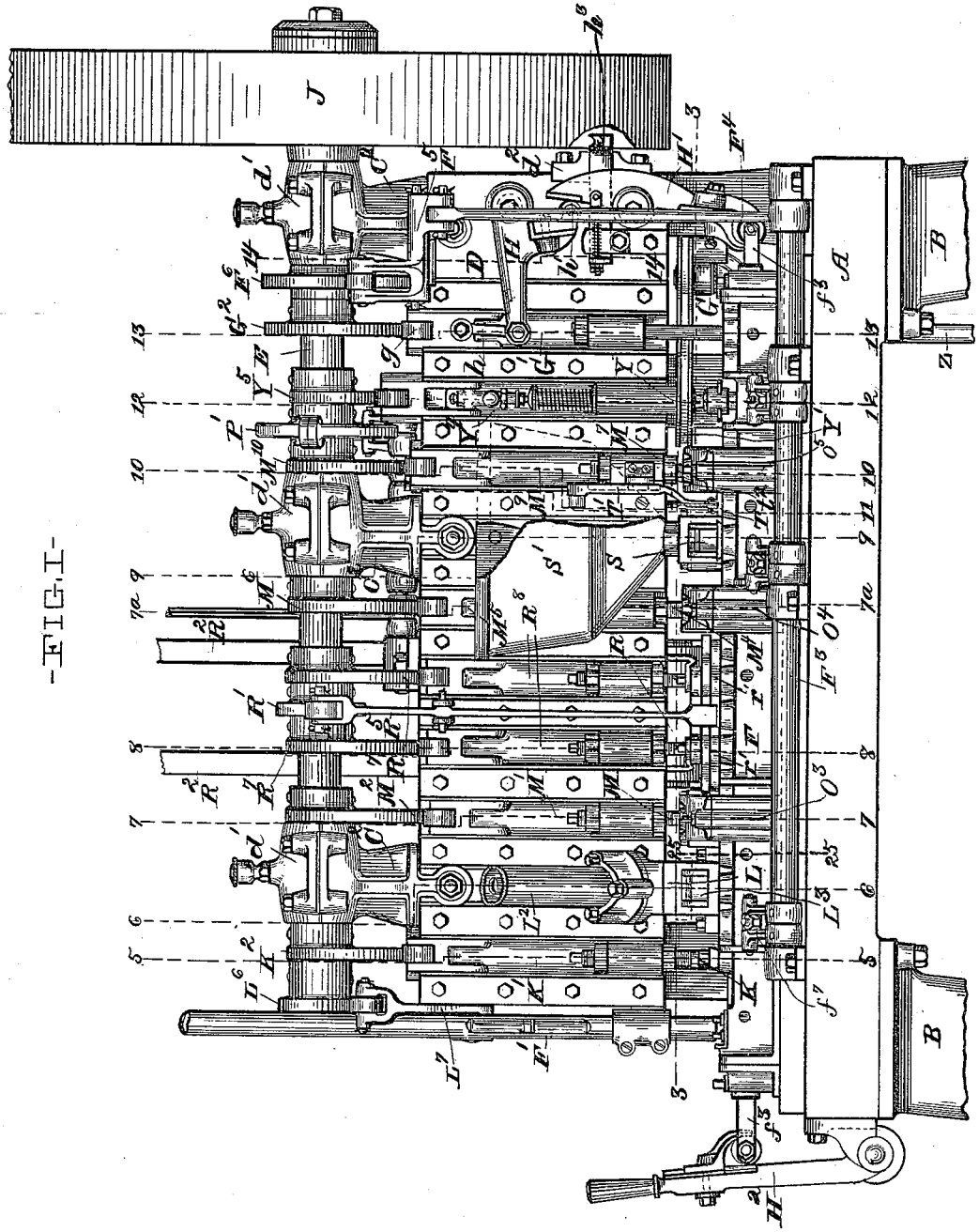
Witnesses,
J. C. Turner
N. Emerkel
Inventor,
Wm. L. Morris
By J. B. Fay
Atty.

No. 639,080. Patented Dec. 12, 1899.
W. L. MORRIS.
CARTRIDGE LOADING MACHINE.
(Application filed Jan. 23, 1899.)
(No Model.) 17 Sheets—Sheet 2.
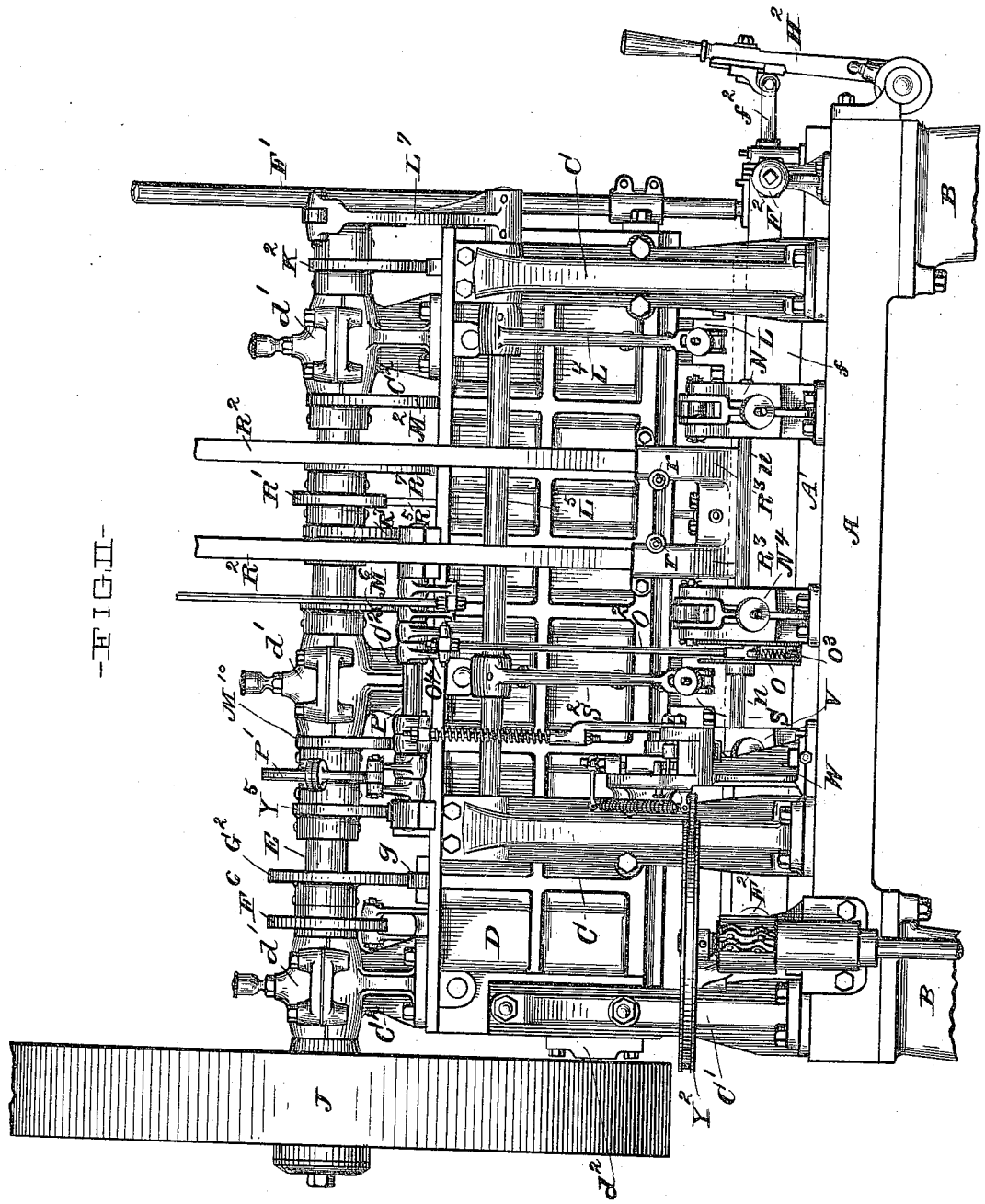
Witnesses,
Inventor,
Wm L. Morris
By J. D. Fay
Atty.

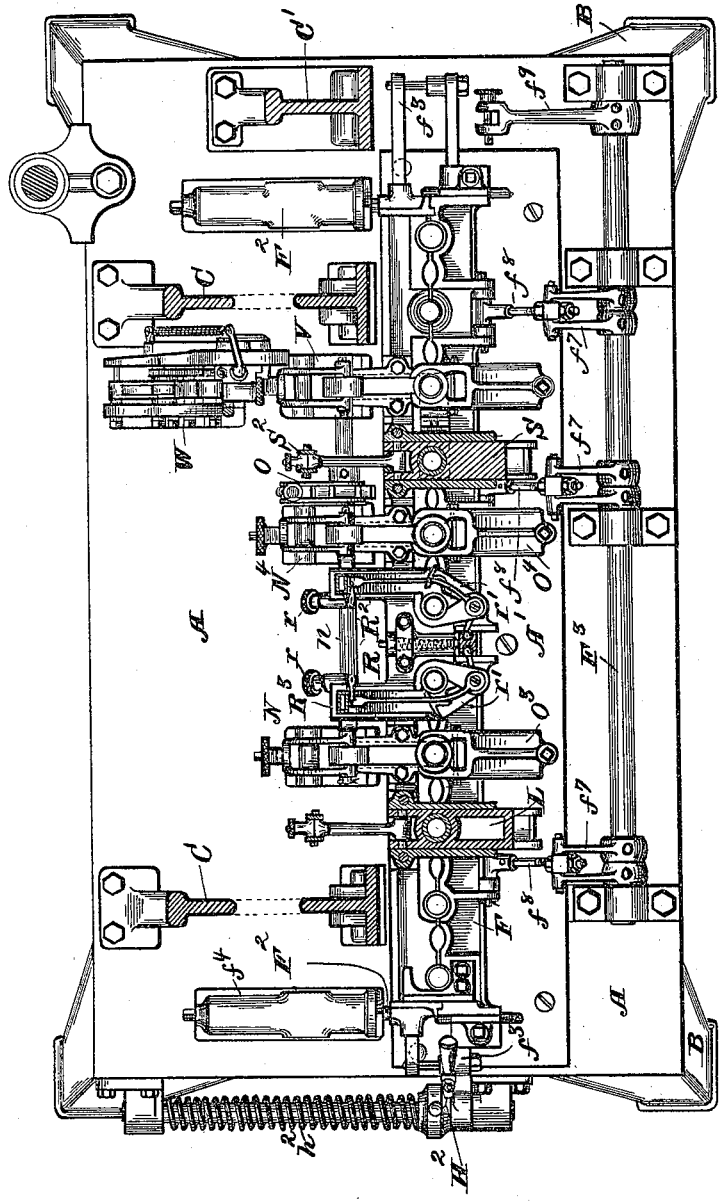

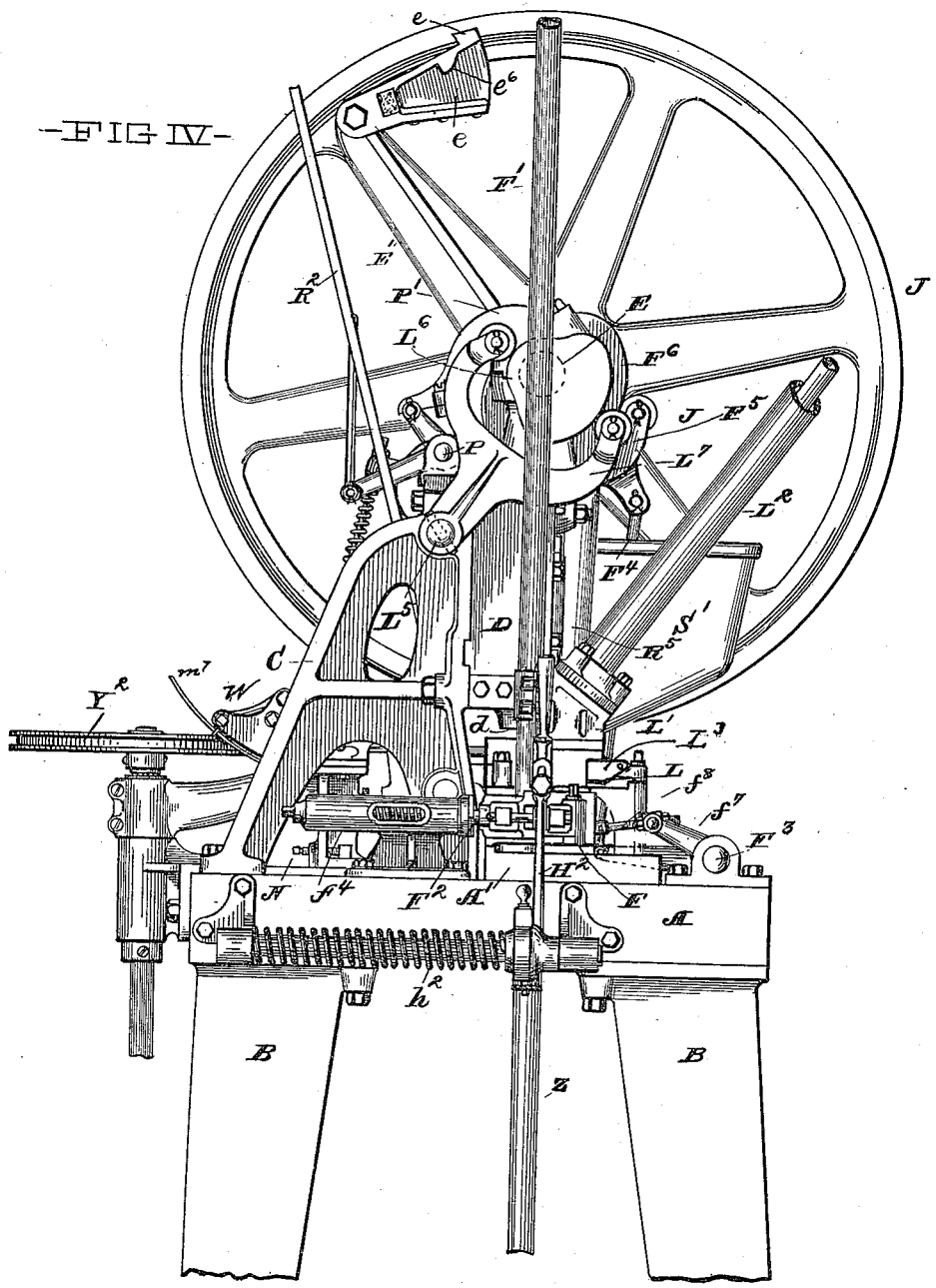

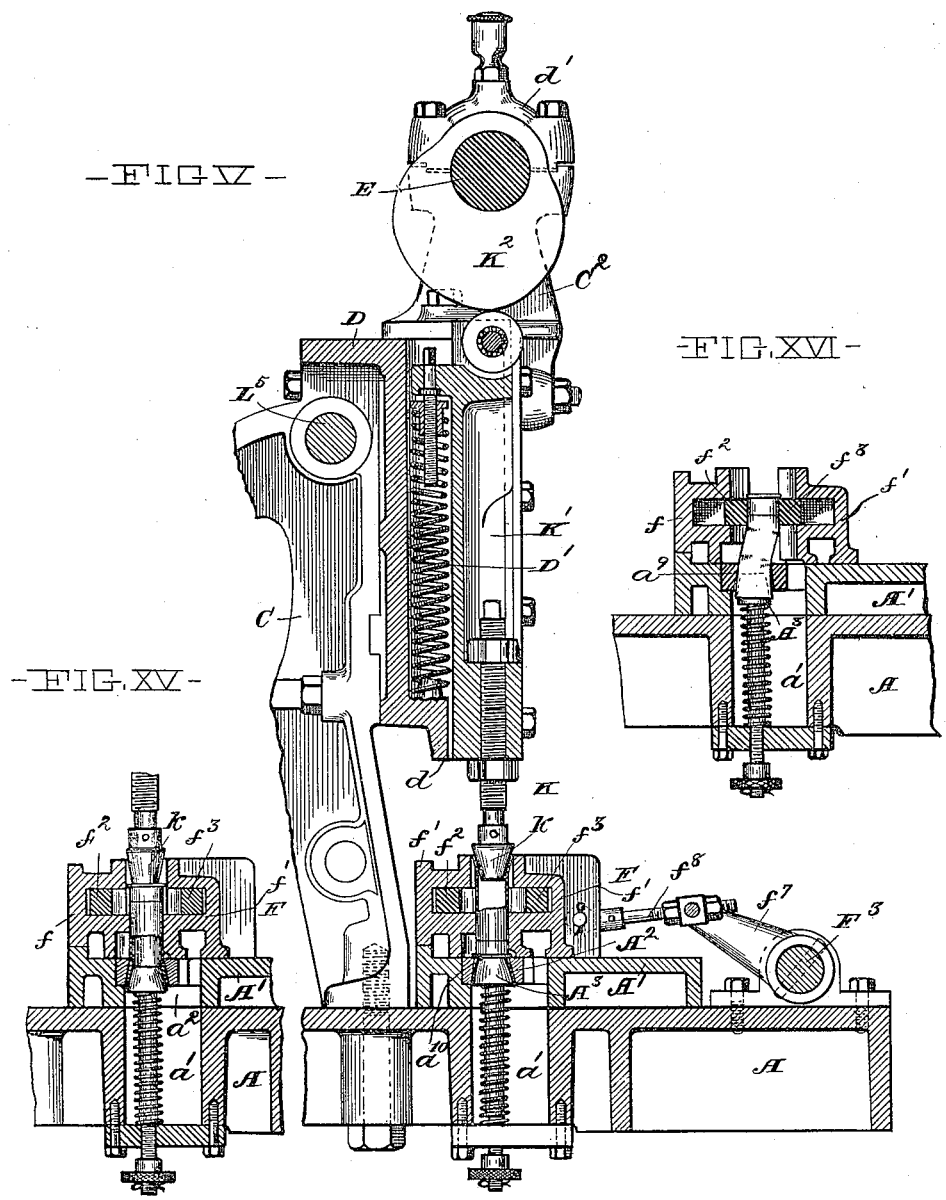

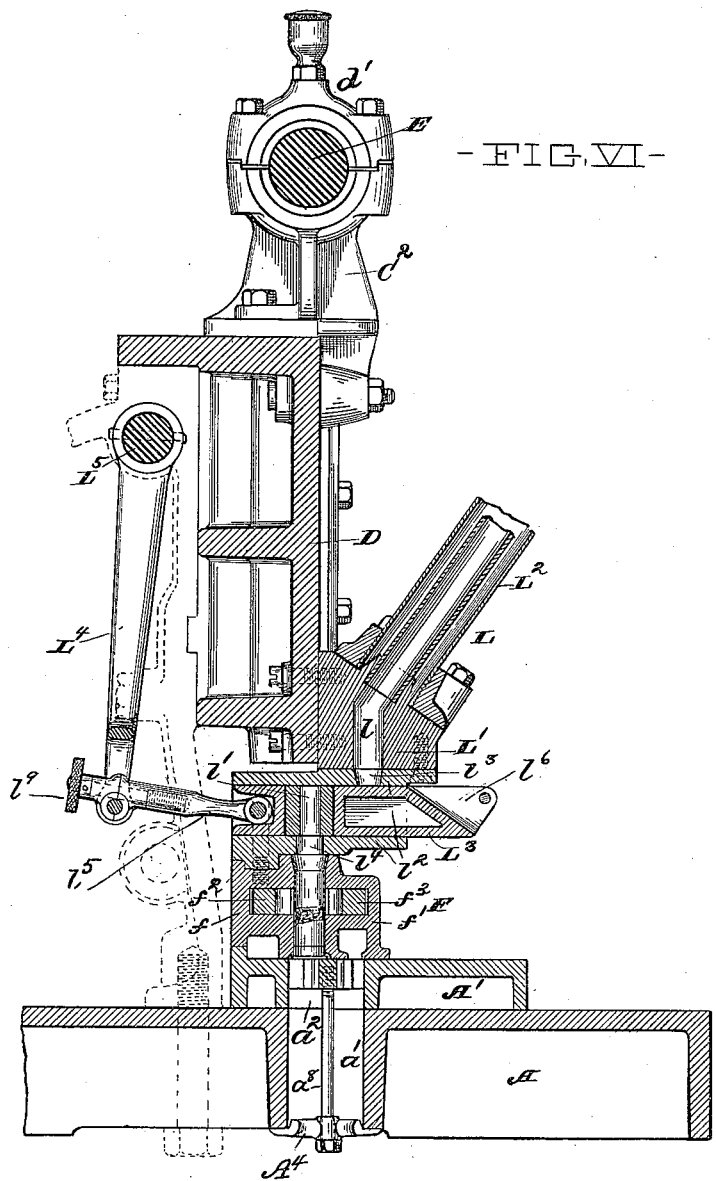

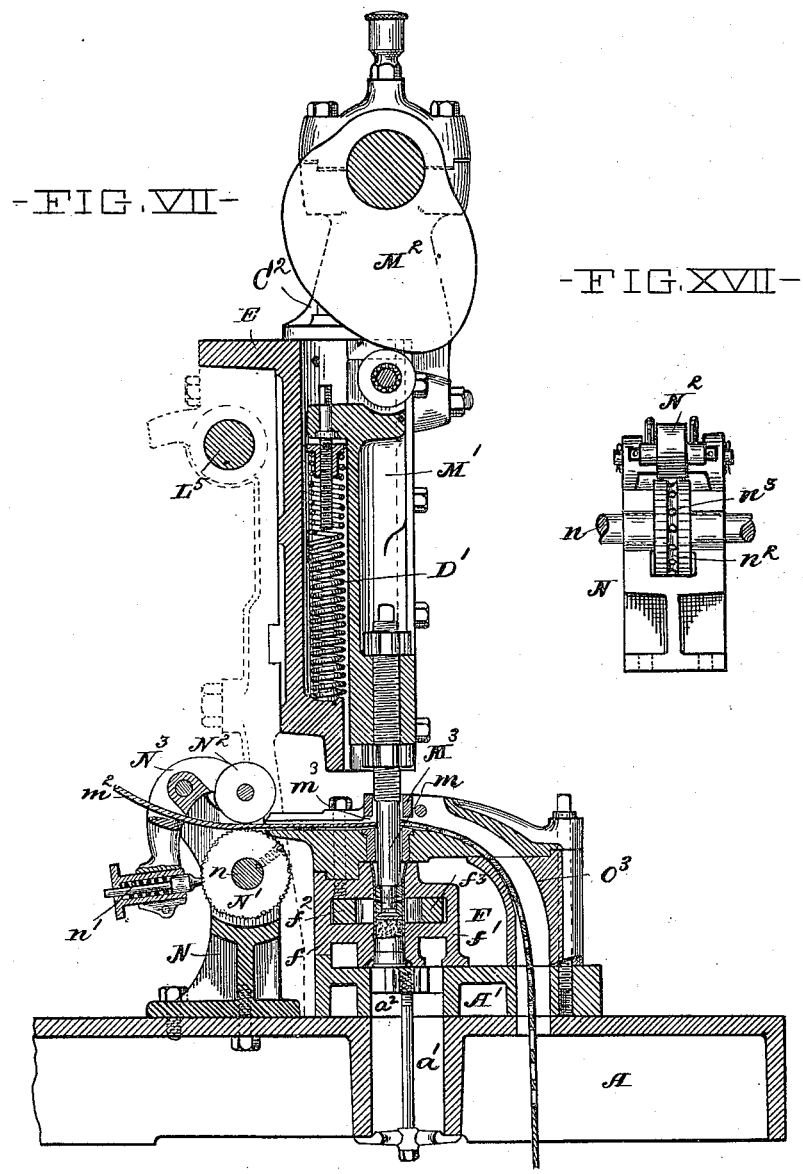

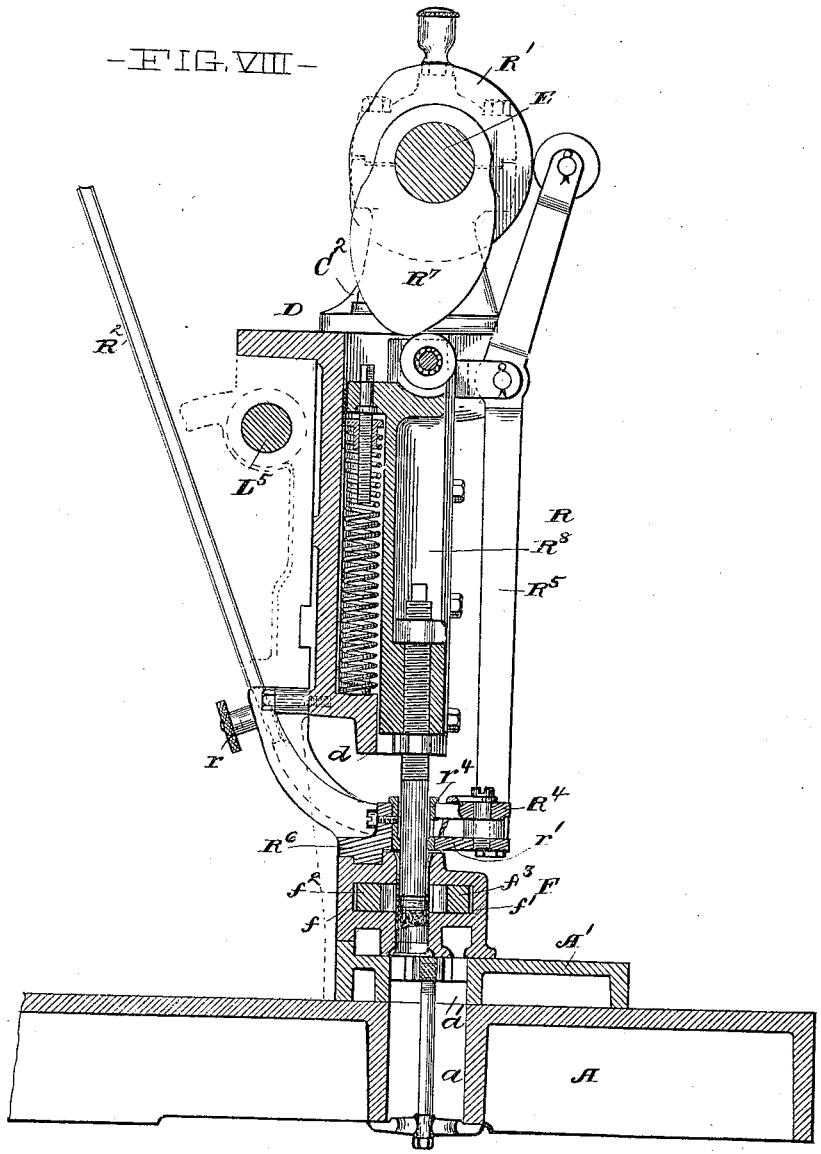

No. 639,080. Patented Dec. 12, 1899.
W. L. MORRIS.
CARTRIDGE LOADING MACHINE.
(Application filed Jan. 23, 1899.)
(No Model.) 17 Sheets—Sheet 9.
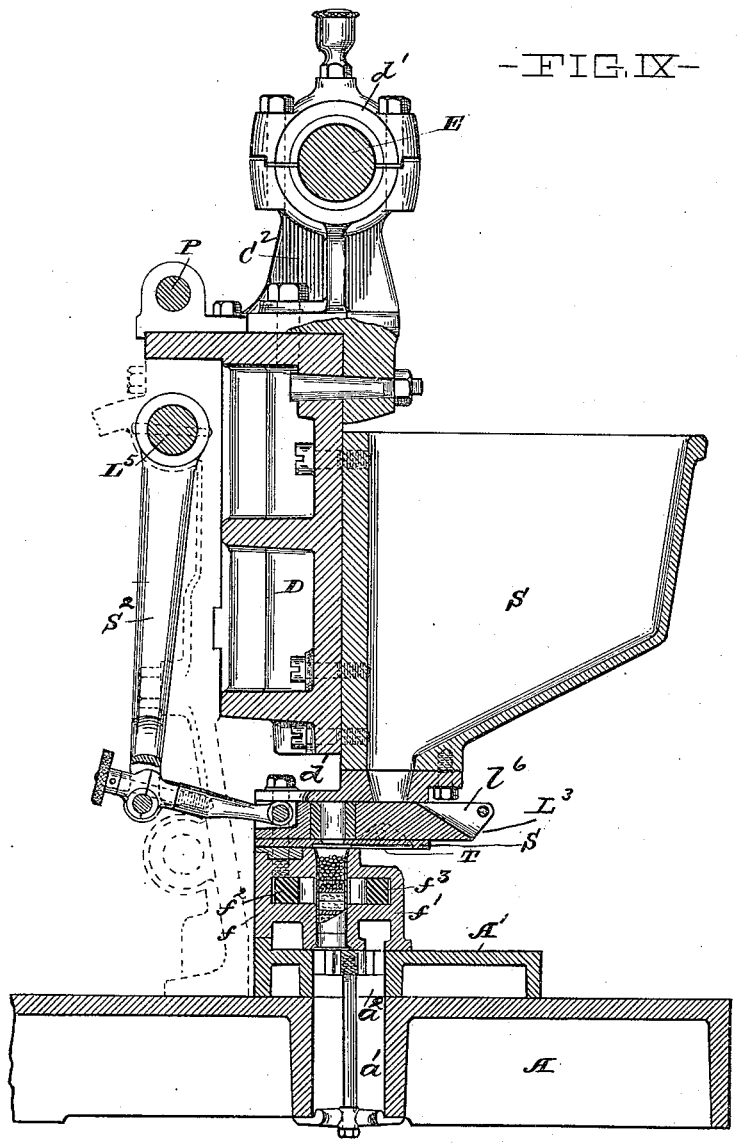

No. 639,080. Patented Dec. 12, 1899.
W. L. MORRIS.
CARTRIDGE LOADING MACHINE.
(Application filed Jan. 23, 1899.)
(No Model.) 17 Sheets—Sheet 10.
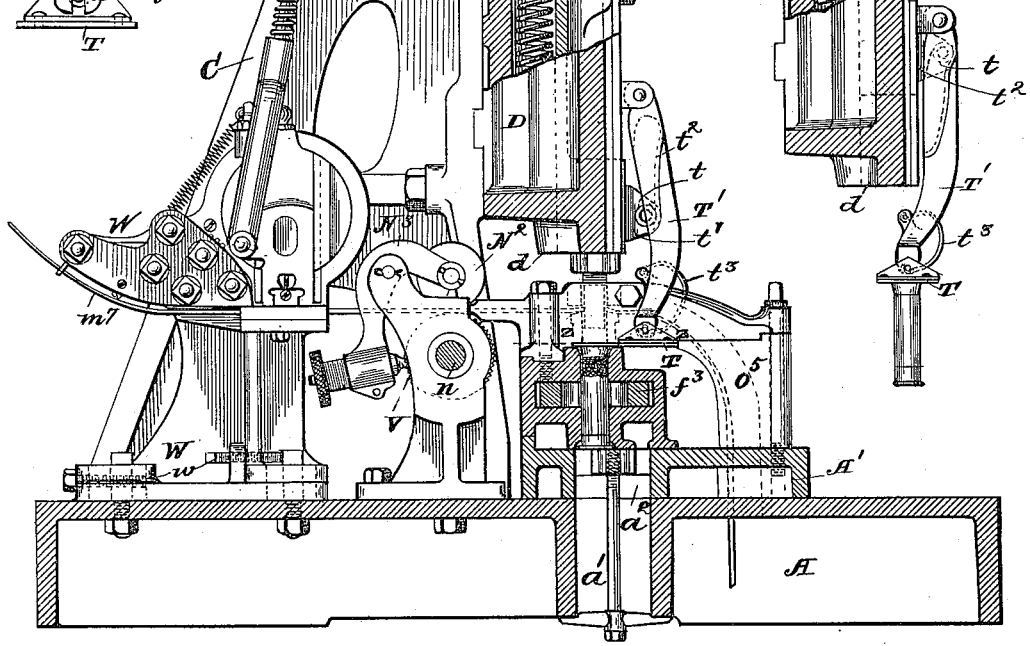

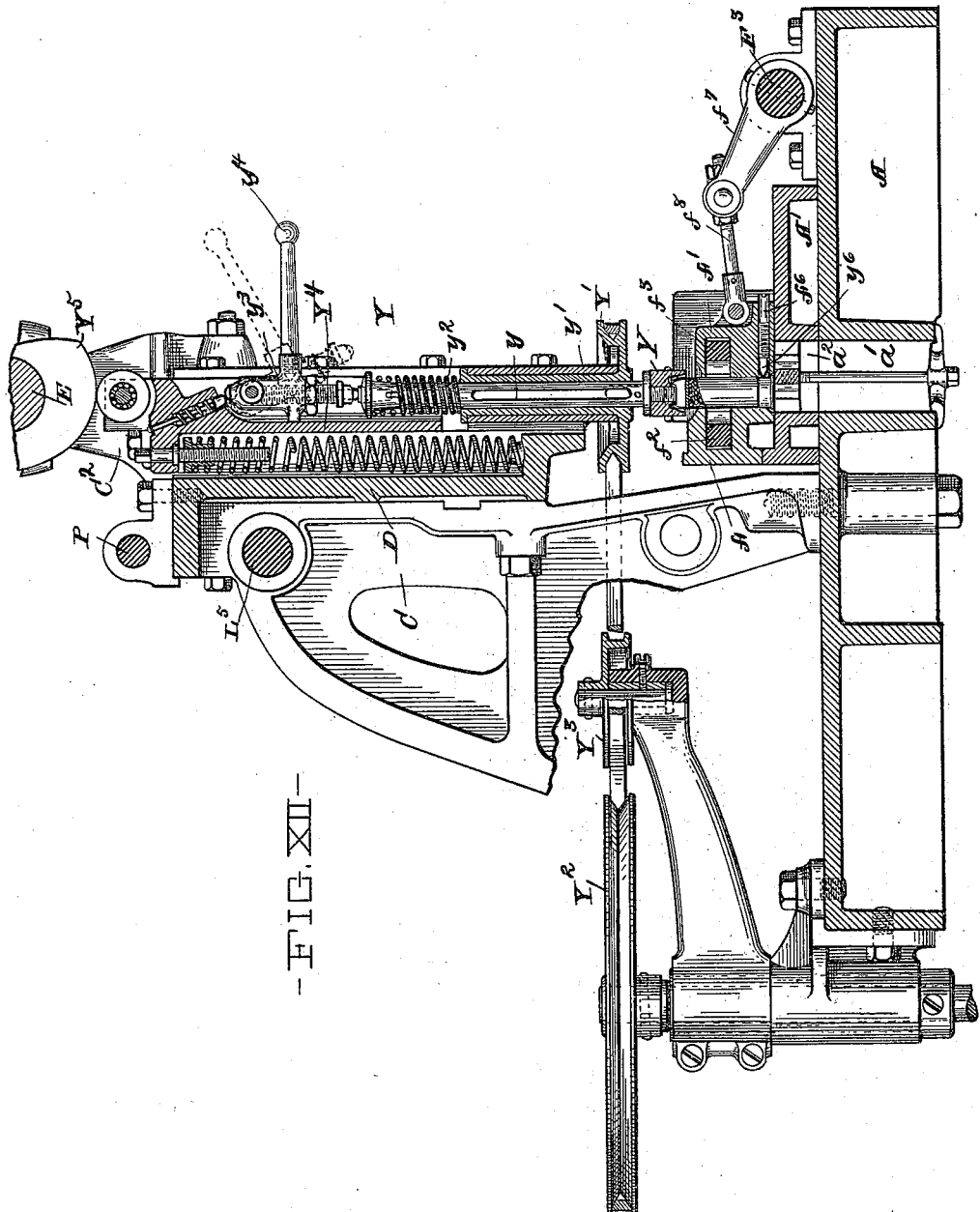

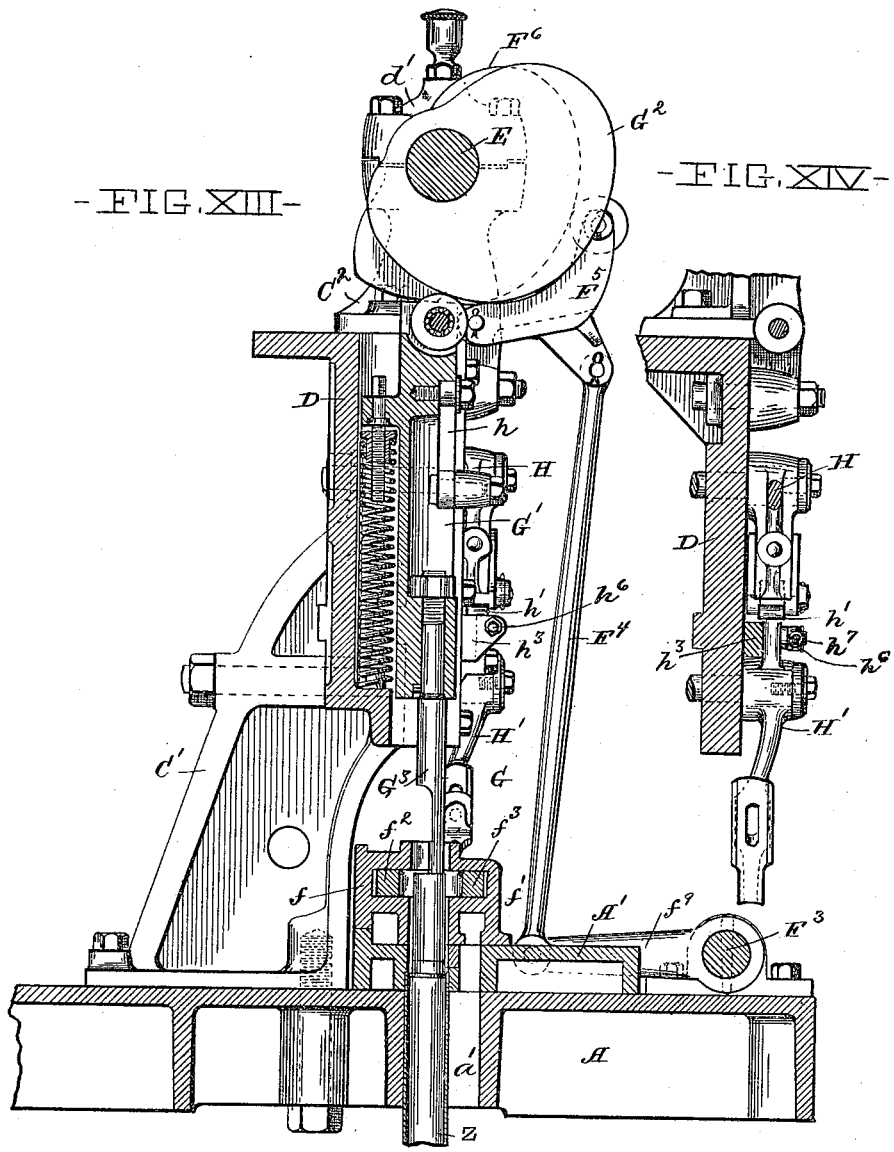

No. 639,080. Patented Dec. 12, 1899.
W. L. MORRIS.
CARTRIDGE LOADING MACHINE.
(Application filed Jan. 23, 1899.)
(No Model.) 17 Sheets—Sheet 13.
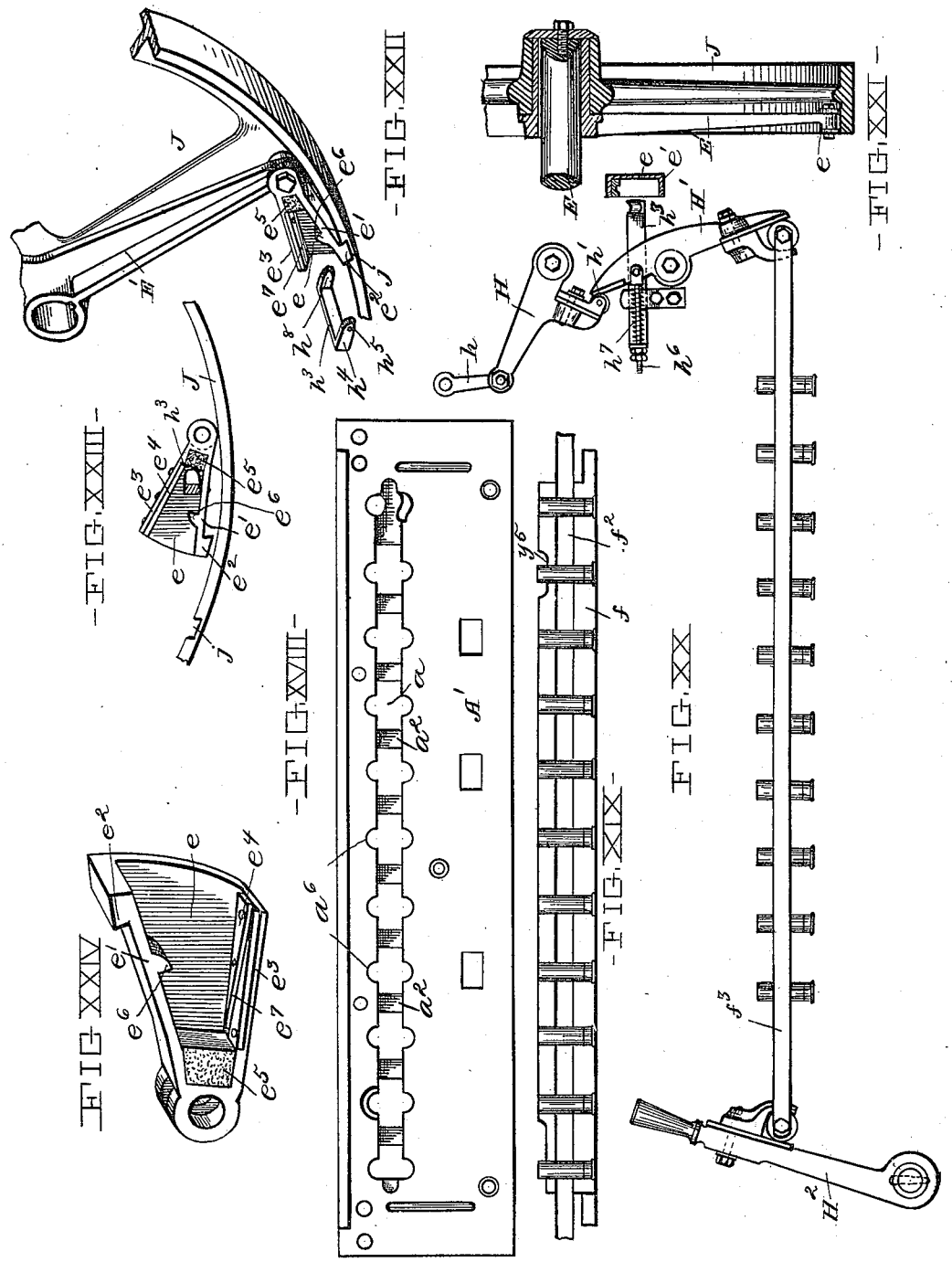
Witnesses,
J. C. Turner
N. E. Merkel
Inventor,
Wm. L. Morris
By J. D. Fay, Atty.

No. 639,080. Patented Dec. 12, 1899.
W. L. MORRIS.
CARTRIDGE LOADING MACHINE.
(Application filed Jan. 23, 1899.)
(No Model.) 17 Sheets—Sheet 14.
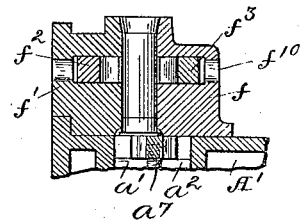
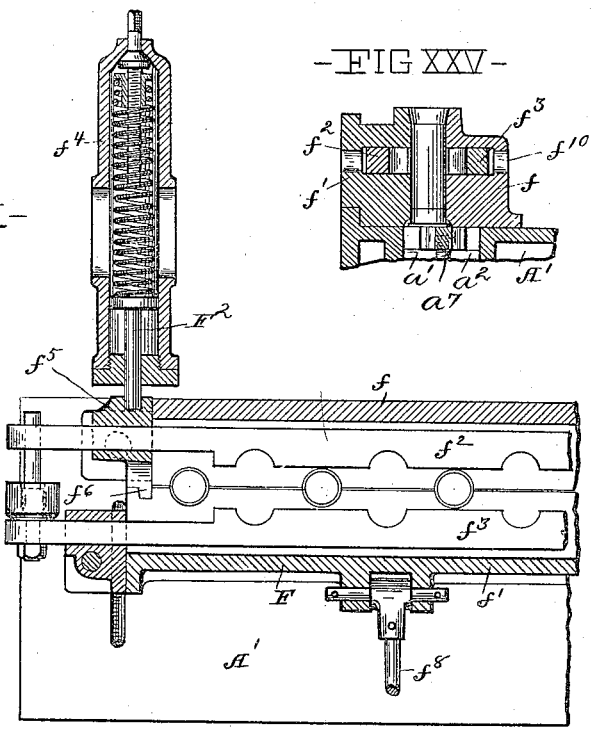
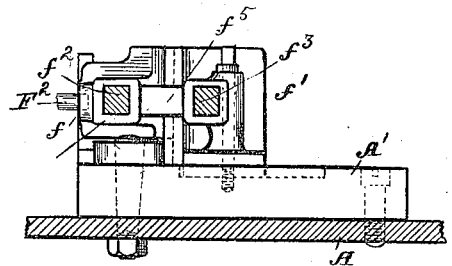
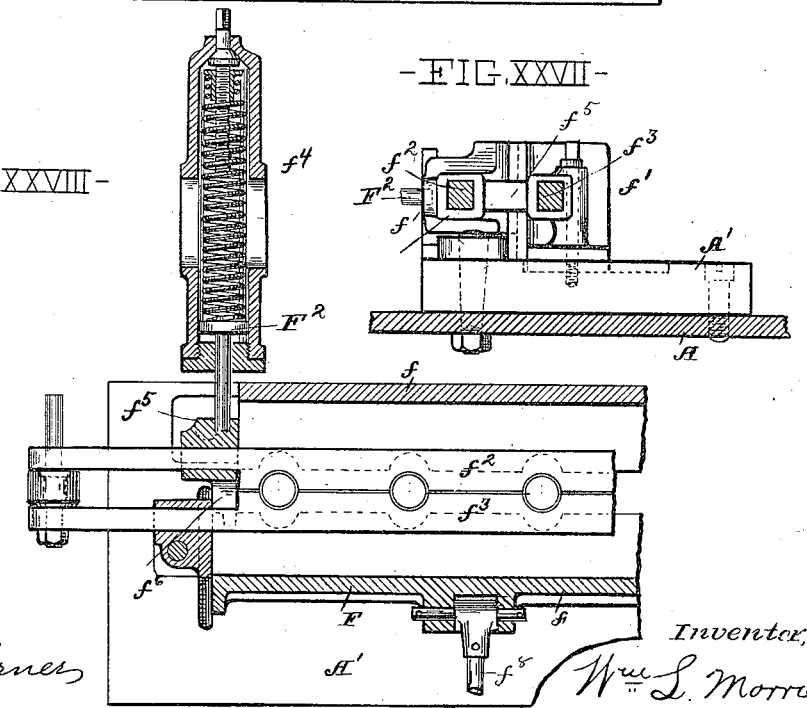
Witnesses
Inventor No. 639,080. Patented Dec. 12, 1899.
W. L. MORRIS.
CARTRIDGE LOADING MACHINE.
(Application filed Jan. 23, 1899.)
(No Model.) 17 Sheets—Sheet 15.
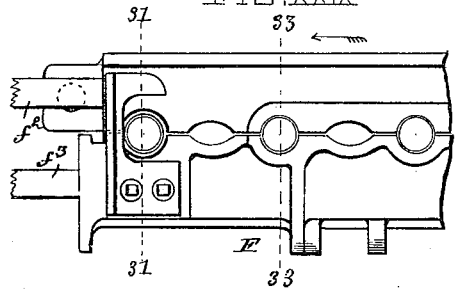
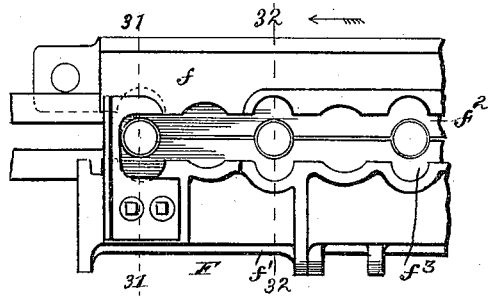
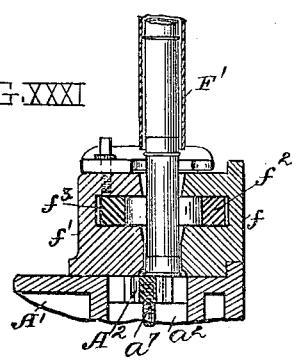
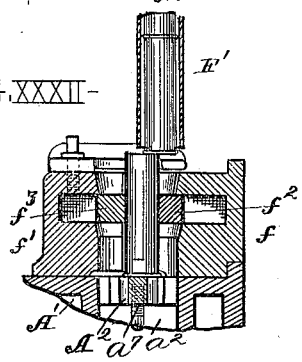
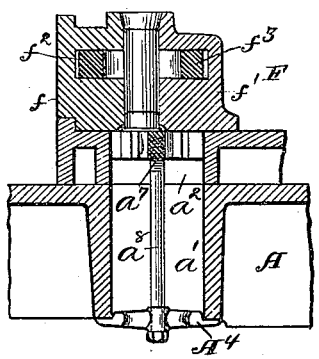
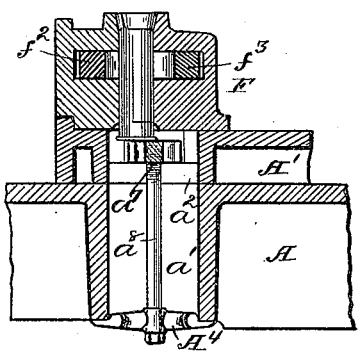
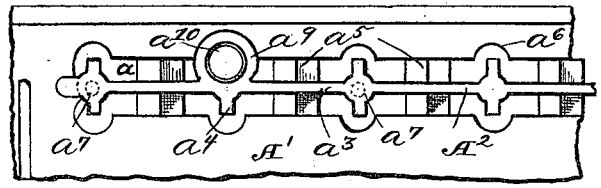
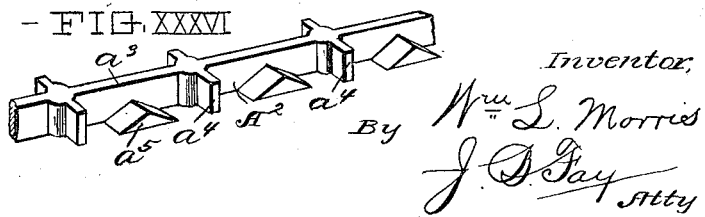

No. 639,080. Patented Dec. 12, 1899.
W. L. MORRIS.
CARTRIDGE LOADING MACHINE.
(Application filed Jan. 23, 1899.)
(No Model.)
17 Sheets—Sheet 16.
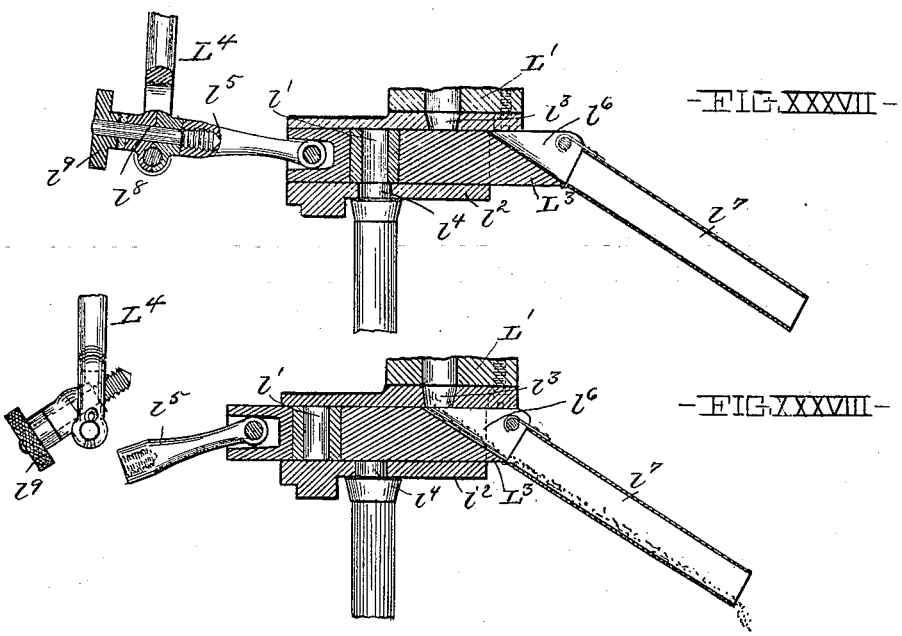
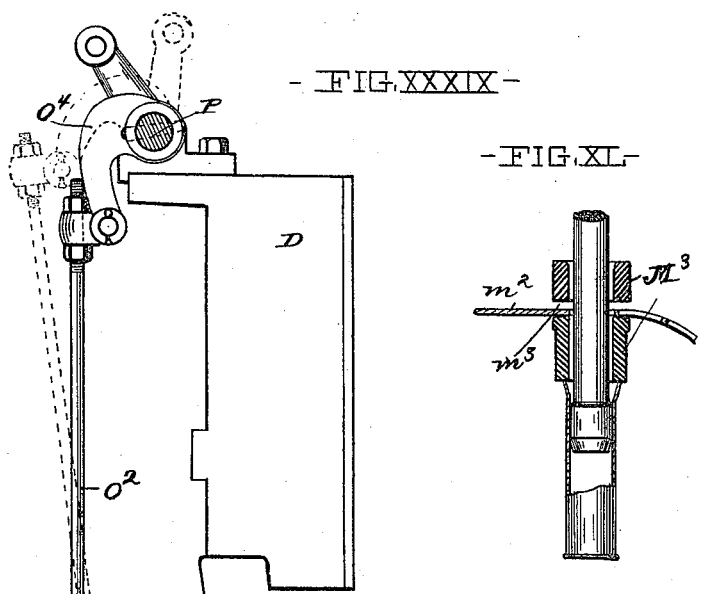
Witnesses,
J. C. Turner
N. E. Merkel
Inventor,
Wm. L. Morris
By J. D. Fay, Atty.

No. 639,080. Patented Dec. 12, 1899.
W. L. MORRIS.
CARTRIDGE LOADING MACHINE.
(Application filed Jan. 23, 1899.)
(No Model.) 17 Sheets—Sheet 17.
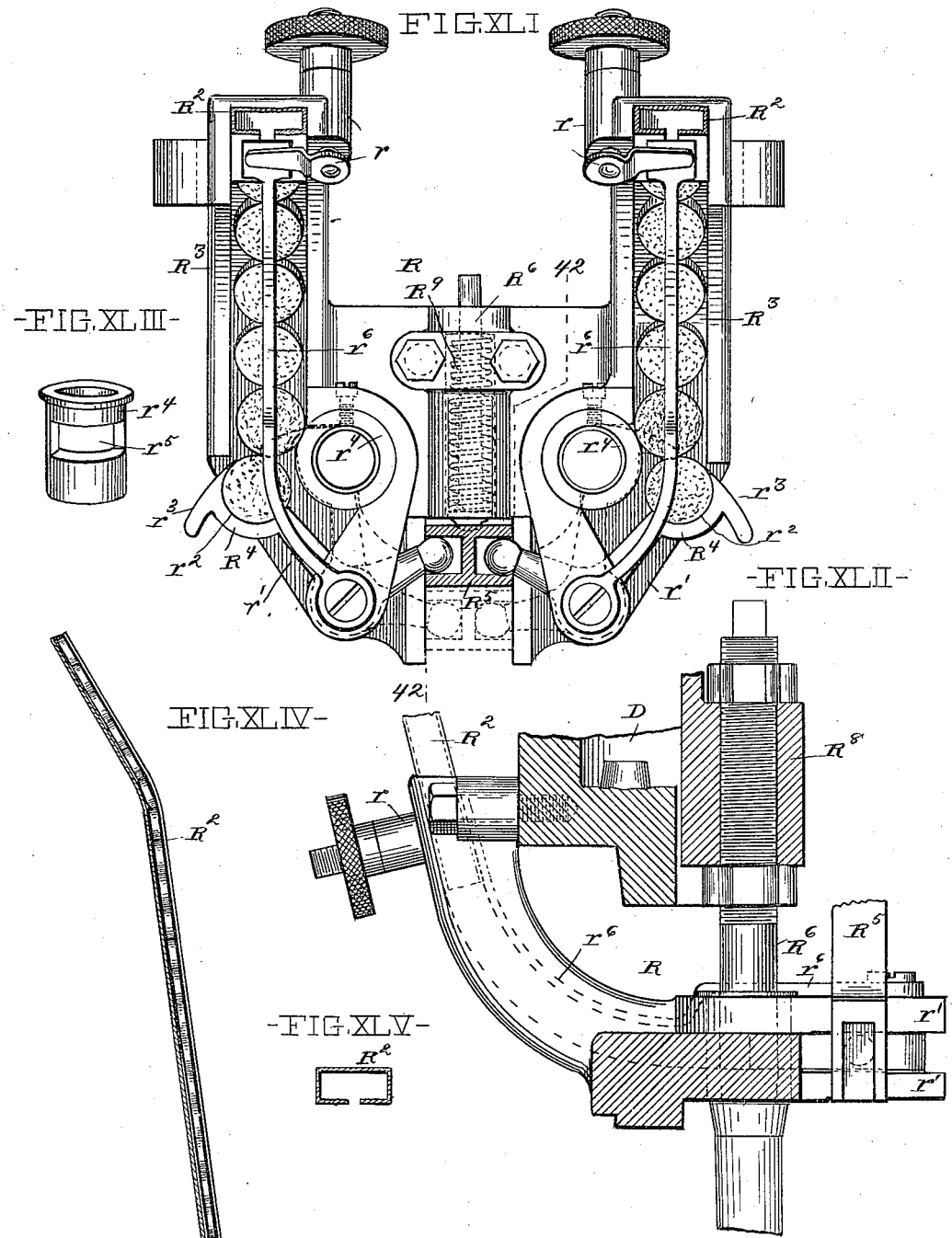
Witnesses
Inventor
Wm. L. Morris

UNITED STATES PATENT OFFICE.

WILLIAM L. MORRIS, OF CLEVELAND, OHIO, ASSIGNOR TO THE AUSTIN CARTRIDGE COMPANY, OF OHIO.

CARTRIDGE-LOADING MACHINE.

SPECIFICATION forming part of Letters Patent No. 639,080, dated December 12, 1899.

Application filed January 23, 1899. Serial No. 703,169. (No model.)

*To all whom it may concern:*

Be it known that I, WILLIAM L. MORRIS, a citizen of the United States, and a resident of Cleveland, county of Cuyahoga, and State of Ohio, have invented a new and useful Improvement in Shell-Loading Machines, of which the following is a specification, the principle of the invention being herein explained and the best mode in which I have contemplated applying that principle so as to distinguish it from other inventions.

The annexed drawings and the following description set forth in detail certain mechanism embodying the invention, such disclosed means constituting but one of various mechanical forms in which the principle of the invention may be used.

In said annexed drawings, Figure I represents a front view of the entire machine, showing the shot-hopper partially broken away to disclose part of the machine in the rear thereof. Fig. II represents a rear view of the machine; Fig. III, a horizontal section taken upon the plane indicated by line 3 3, Fig. I. Fig. IV represents an end elevation of the entire machine looking toward the left end. Figs. V, VI, VII, VIII, IX, X, XI, XII, and XIII represent vertical sectional views taken upon planes respectively indicated by lines 5 5, 6 6, 7 7 or 7ª 7ª, 8 8, 9 9, 10 10, 11 11, 12 12, and 13 13 shown in Fig. I, portions of the machine cut by said planes being shown in elevation, each of these sections being that as viewed from the left and looking toward the right and portions of the mechanism to the right of the sectional plane being omitted for simplicity. Figs. XIª and XIᵇ represent detail views, Fig. XIª taken on line z z, Fig. X. Fig. XIV represents a partial sectional view taken on the plane indicated by line 14 14 on Fig. I. Fig. XV represents a detail partial sectional view taken upon line 5 5, showing the shell-opener in a position wherein it is operating upon an inverted shell. Fig. XVI represents a similar view wherein the opener-tool is omitted and showing the position assumed by such inverted shell when operated upon by the shell-carrier. Fig. XVII represents a front view of one of my improved strip-feed rolls. Fig. XVIII represents a plan view of the sole-plate of the machine, upon which is supported the shell-conveyer. Fig. XIX represents a front view of the rear half of the shell-conveyer. Fig. XX represents a front view of the shell-carrier and its reciprocating means detached from the machine. Fig. XXI represents a partial central longitudinal section of the driving-pulley, showing a portion of the operating-shaft in elevation therein. Fig. XXII represents a partial perspective view of the driving-pulley, showing the driving-arm, which is secured to the operating-shaft, the trip member, which connects the said arm with the pulley, and the trip-bolt. Fig. XXIII represents a side elevation of a portion of the pulley-rim, showing said trip member also in side elevation and a sectional view of the trip-bolt. Fig. XXIV represents an enlarged perspective view of said connecting trip member. Fig. XXV represents a detail cross-sectional view of the shell-conveyer, taken upon a plane indicated by line 25 25 in Fig. I. Fig. XXVI represents a detail central horizontal sectional view of the left end of the shell-clamps upon the sole-plate, showing the shell-carrier in plan view therein and open, also showing a sectional view of the means for actuating the rear conveyer-bar and front shell-clamps in their transverse movement. Fig. XXVII represents a detail left-hand end elevation of the shell-conveyer and sole-plate upon a section of the frame. Fig. XXVIII represents a detail view taken upon the same plane as was the view shown in Fig. XXVI and of the same parts, showing the conveyer-bars in their closed position assumed at the completion of the outward transverse movement. Figs. XXIX and XXX represent plan views of the left end of the shell-conveyer in the positions in which the shell-clamps are closed and open, respectively. Fig. XXXI represents a cross-section of the shell-conveyer, taken upon the plane indicated by line 31 31 in Fig. XXIX looking in the direction indicated by the arrow, showing also a shell in elevation held by the clamps and a cross-section of the shell-feed tube with shells in elevation therein, showing the shell-stop in elevation thereon. Fig. XXXII represents a section of the shell-conveyer, taken on the plane indicated by line 32 32 in Fig. XXX, showing the shell-clamps open and the shell secured by the conveyer-bars and in position to be conveyed. Figs. XXXIII and XXXIV represent detail cross-sectional views of the shell-conveyer, taken on a plane indicated by line 33 33, Fig. XXIX, looking in the direction opposite that indicated by the arrow, showing a partial section of the sole-plate and bed and illustrating the arrangement of the shell-support for use in loading shells of different lengths. Fig. XXXV represents a partial plan view of the sole-plate which supports and forms a bearing for the shell-conveyer, showing the shell-support in position thereon. Fig. XXXVI represents a perspective view of a portion of the shell-support. Fig. XXXVII represents an enlarged cross-sectional view of the powder-slide and attached parts; and Fig. XXXVIII represents a similar view of said slide, illustrating its position when the powder is being discharged from its reservoir. Fig. XXXIX represents a detail view of the wad-strip-feed-roll-operating means. Fig. XL represents a detail cross-sectional view of one of the wad-punch dies and guides, showing the rammer in elevation. Fig. XLI represents an enlarged detail plan view of the felt-wad feeding and transferring means. Fig. XLII represents a section of said feeding and transferring means, taken upon the planes indicated by the line 42 42, Fig. XLI; and Fig. XLIII represents a perspective view of the wad-receiving thimble and rammer-guide of said means. Figs. XLIV and XLV represent a vertical longitudinal and a horizontal section of the felt-wad-feed tube.

A main horizontal bed A is supported upon suitable legs B, and bolted to the upper face of the bed are two upright brackets C C, to the front of which is bolted the vertical cross-plate D, whose bottom face $d$ is elevated some distance above the bed A, as shown in Fig. V. At equidistant intervals along the front face of the cross-plate are arranged a series of loading devices, all operating in the same plane parallel with said cross-plate, which plane I shall hereinafter designate the "loading" plane. These devices consist of a feed-tube for feeding empty shells to the shell-conveyer, a shell-opener for expanding the mouth of each shell, powder-loading means, a device for inserting a paper wad on the powder, a device for inserting a felt wad, a second device for inserting a second felt wad, a second paper-wad-inserting device for inserting a second paper wad, a device for loading the shot, a third device for inserting a third paper wad, a device for crimping the mouth of the shell, and a device for ejecting the loaded shell from the conveyer, all arranged from left to right, Fig. I, in the order named. The shell-opener, the rammers in connection with the wad-inserting devices, the crimper, and the ejector are mounted upon vertically-reciprocating slides whose guides are formed in the cross-plate D and which are operated positively in a downward direction by cams and upwardly by springs D', located as shown in Figs. V, VII, and XII.

Mounted in suitable bearings $d'$ on standards $C^2$, bolted to the top of the cross-plate, and upon a bracket C' is an operating-shaft E, to which are secured a series of cams and an eccentric for operating the various devices.

Operating immediately below the cross-plate and upon the bed of the machine is a reciprocating shell-conveyer F, which receives the shells from the shell-feed tube F' and progressively advances them from left to right to the successive positions on the loading plane necessary for the operation of the loading devices, constructed and operating substantially as shown and described in my Patent No. 612,864, issued October 25, 1898. Each shell is moved from left to right and brought to a state of rest into different positions in the loading plane, so that it may be operated upon by each loading device in succession, the various operating-cams, levers, and eccentrics being so timed that the loading operations take place during the time the shell is in such state of rest. As described in said patent, the conveyer consists of a pair of shell-clamps $f$ and $f'$, which hold the shells firmly while at rest and being operated upon, Fig. V, of which one, $f$, is fixed and the other, $f'$, is reciprocable transversely, and a pair of longitudinally-reciprocable conveyer-bars $f^2$ and $f^3$, forming a shell-carrier, of which $f^2$ is reciprocable transversely and $f^3$ is fixed transversely and which conveys the shells to their successive positions in the loading plane, during which time the shells are freed from the clamps. The transverse opening movement of the clamp $f'$ and conveyer-bar $f^2$ is effected by two spring-bolts $F^2$, Fig. II, incased in suitable barrels $f^4$, secured to the bed, constructed and applied as shown in Fig. XXVI, each one of which bolts engages a bearing $f^5$, Figs. XXVI and XXVII, one on each end of the conveyer-bar $f^2$. Said bearings abut the inner face of the clamp $f'$ by means of a lug $f^6$, as shown in Fig. XXVII, and effect its transverse movement toward the front of the machine simultaneously with that of the bar $f^2$ to assume the position shown in Fig. XXVIII. The return movement of these parts is effected by the rock-shaft $F^3$, Fig. I, the levers $f^7$, links $f^8$, arm $f^9$, connecting-rod $F^4$, rocker-arm $F^5$, journaled on the cross-plate D and operated by the cam $F^6$, all connected as shown in Figs. I and XII. Air-holes $f^{10}$, Fig. XXV, are provided to permit the conveyer-bars to reciprocate freely on their transverse movement. The operation of this conveyer, as explained in the above-named patent, causes a small amount of transverse movement of the shell out of the loading plane, followed by a longitudinal advance to the right parallel with said plane and a final return transverse movement into said plane.

A cam $G^2$, secured to shaft E, engages a roller $g$ on the top of the slide G' of the ejector G, Fig. I. A bell-crank H is journaled upon the cross-frame and is connected at one end with the end of a link $h$, whose opposite end is secured to the said slide. The other end of the bell-crank is provided with a roller $h'$, which bears against the end of a lever H', fulcrumed upon the cross-frame. The opposite end of said lever H' is connected with one end of the shell-carrier. This train of levers constitutes the means for returning the carrier after the longitudinal advance of the latter, and it is seen that by virtue of the open connection between the bell-crank and the lever H' or the open connection between the cam $G^2$ and the slide G' the carrier may be stopped at any intermediate point in said longitudinal advance movement until such time as the cam reaches the position in which it normally returns said carrier to said stopping-point. During such displacement of the carrier the position of the bell-crank H relative to the lever H' changes from the normal—that is, the roller on the bell-crank relinquishes its contact with the end of the lever. This change involves a change of relative position from the normal of the carrier with reference to the operating-cam G. Said carrier is therefore capable of displacement relatively to its operating means. In order to give the said carrier its longitudinal advance movement, the said conveyer-bar is connected at the end opposite that connected with the lever H' to a lever $H^2$, Figs. I, IV, and XX, actuated by a torsion-spring $h^2$, to throw the carrier forward during the recession of the cam $G^2$ from the roller $g$. The combined actions then of the spring-actuated lever $H^2$ and the cam-actuated lever H' cause the reciprocation of the shell-carrier, one solely causing the advance movement and the other solely causing the positive return movement thereof.

Upon the right-hand end of the shaft E is keyed an arm E', Figs. XXI and XXII. Adjacent to said arm and loosely mounted upon a hub or sleeve thereof is a driving-pulley J. Said arm extends to within a short distance of the inside of the rim of the pulley, as shown in Figs. IV, XXI, and XXII, and pivoted to the free end of said arm is a V-shaped connecting trip member $e$. Said member has formed upon its outer leg $e'$ a projecting lug $e^2$, which engages a shoulder $j$, formed upon said pulley, as shown in Fig. XXII. The inner leg $e^3$ of the connecting member extends inwardly from the outer leg, and its inner face forms an inclined plane $e^4$ with reference to a fixed point in its revolution. At the juncture of the two legs $e'$ and $e^3$ is placed a rubber buffer $e^5$, and upon the leg $e'$ is formed a stop-lug $e^6$. It will be observed from the above-described construction of these means which form operative connection between the driving-pulley and the operating-shaft or its arm that the interposition of a relatively-fixed obstruction in the path of the inclined plane $e^4$ will cause said trip member $e$ to relieve itself from engagement with the pulley, and thus cause the driving-pulley to become inoperative and the shaft, shell-carrier, and loading devices to stop. Such interposition is accomplished by the following means: Sliding in a guideway $d^2$, secured to the cross-frame, Fig. I, is a trip-bolt $h^3$, formed at its left-hand end with an angle $h^4$, Fig. XXII, provided with a bore $h^5$, through which slides a rod $h^6$, Fig. XX, secured to the lever H'. A spring $h^7$ is interposed between the right-hand end of said rod and the angle $h^4$, as shown in Fig. XX, which maintains the normal distance between the lever H' and the end of the bolt, but permits the arrest of the bolt, while the upper end of said lever is permitted to travel toward the left, or permits the bolt to be drawn to the right at a greater than normal speed. Normally the bolt reciprocates in unison with the oscillation of the lever H' and is arranged so that its outer end projects into the path of the inclined plane $e^4$ at all points during the normal advance of the shell-carrier excepting at or near the end of such advance stroke, when the said bolt is withdrawn by the lever to its extreme left position, as shown in Fig. XX, whereby the inclined plane is normally permitted to pass unobstructed during its apposition with the bolt. At all other points in the travel of the said shell-carrier the path of the end of the trip-bolt intersects the path of the inclined plane. It is therefore evident that a change of position of the carrier relative to its operating means, and consequently to the driving means, so as to produce a displacement of said carrier, will produce a displacement of the bolt with reference to the passing inclined plane, whereby said bolt is caused to intersect the path of said plane at the time of passing. The trip member $e$ as a result of such displacement is disconnected from the pulley, the latter rendered inoperative, and the machine stopped. The operativeness or inoperativeness of the driving means of the machine is hence controlled by the relative position of the shell-carrier and the driving means.

In order to cause the outer end of the bolt to properly engage the pivoted member, the inclined plane is provided with a cam-groove $e^7$, Fig. XXIV, which traverses the inclined plane from its outer to its central portion, and the bolt end is provided with a lug $h^8$ for engaging said groove. By means of this construction the bolt is caused to strike the buffer at its inner portion after having been well drawn in, so as to prevent the possibility of transverse disengagement. The stop-lug $e^6$ prevents the longitudinal disengagement of the bolt and pivoted member during their engagement.

The above-described clutch and tripping mechanism being applicable to machines other than shell-loading machines, a separate application for United States Letters Patent will be filed for said mechanism *per se*.

Beneath the series of loading devices and secured to the bed of the machine is a sole-plate A', Fig. IV, which forms a support and bearing for the shell-clamps. Longitudinally of said plate and occupying a central position with reference to the two conveyer-bars when in their closed position and parallel with said bars is a slot $a$, registering with a similar longitudinal opening $a'$ in the bed, Fig. V. Across the slot are transverse bridges $a^2$, Fig. XVIII, whose upper surfaces fall below the upper surface of the sole-plate, as shown in Figs. XXXIII and XXXIV. Upon these bridges is laid a removable shell-support $A^2$, upon which the closed end of each shell while being operated upon by the loading devices rests and travels while being conveyed. By means of this construction shell-supports of varying heights may be used to accommodate different lengths of shells, as shown in Figs. XXXIII and XXXIV. The width of the slot $a$ is sufficient to allow the conveyer to move the shell transversely by the transversely-movable conveyer-bar $f'$ where a shell-support is used whose upper surface falls below the upper surface of the sole-plate, as shown in Fig. XXXIV.

The shell-supports are each formed with a main longitudinal web $a^3$, of less width than the slot $a$, and with lateral lugs $a^5$, extending equal distances on each side of the web, Figs. XXXV and XXXVI, the distance between the lateral faces of the lugs being equal to the width of the slot $a$ and the distance between successive lugs being equal to the distance between successive bridges $a^2$. Lugs $a^4$ are also formed at equal intervals opposite semicircular recesses $a^6$, cut into the sides of the slot $a$. Threaded bores $a^7$ are formed at intervals in the shell-support, into which are screwed bolts $a^8$ of clips $A^4$, which engage the under face of the bed-plate at each side of the opening $a'$. The shell-support is secured against lateral or longitudinal displacement, the lugs $a^5$ resting upon the bridges $a^2$. The base is thus provided with free internal faces, whereby any refuse which would tend to interfere with the proper operation of the carrier may fall through and be thus removed. The lugs $a^4$ are disposed so as to fall vertically beneath each loading-tool, forming a base for the shell during the loading operation.

After being fed to the shell-conveyer through the tube F', as described in my above-mentioned patent, the first loading device to the operation of which the shell is subjected is the shell-opener K, which consists of an opener-tool having a conically-shaped plug $k$ and secured to the vertically-reciprocating slide K', operated by the cam K², secured to the operating-shaft E, Fig. V. This plug enters on its downward movement the mouth of the shell, expanding it for greater facility in loading. Vertically beneath said plug the shell-support $A^2$ is formed with an enlargement $a^9$, Fig. XXXV, in which is formed a conically-shaped opening $a^{10}$, whose axis coincides with the opener-tool axis and into which projects a spring-pressed and depressible plug $A^3$. (Shown in Fig. V.) The diameter of the opening $a^{10}$ is slightly greater than the outer diameter of the open end of a shell and less than the diameter of the closed end. The diameter of the upper end of the plug $A^3$ is somewhat less than the inner diameter of the shell. An open annulus is thus formed at the upper portion of the said opening, into which the open end of a shell may enter. A shell being fed accidentally to the conveyer in an inverted position, it is carried to the shell-opener and placed in position to be operated upon by the latter, which, descending, strikes the closed shell end and drives the open shell end into the opening $a^{10}$, as shown in Fig. XV. The plug $A^3$, urged upwardly by its spring, holds said open end fast in the opening and prevents the withdrawal of the shell on the further operation of the machine. The shell-clamps release the shell and the two conveyer-bars close upon it, displacing the upper portion of the shell laterally from the opening $a^{10}$, as shown in Fig. XVI, and by the previously-described action of the lever H², actuated by the torsional spring $h^2$, said conveyer-bars attempt to convey the shell forward. This, however, is prevented by the connection formed between the stationary shell-support and the two conveyer-bars, and the action of said spring $h^2$ being overcome the carrier stops. This interruption of the movement of the carrier by the interposition of a shell in its path produces at once the previously-described displacement of said carrier, thereby rendering the tripping mechanism operative, disconnecting the driving-pulley from the operating-shaft, and discontinuing the operation of the loading devices, whereby the discharge of the material into the clamps is prevented. From the shell-opener the shell is conveyed along the shell-support by the shell-carrier and placed in position for being operated upon by the powder-charging device L, Fig. VI.

A powder-base L' is suitably secured to the cross-frame D and receives the end of a powder-tube L², which discharges the powder into the registering duct $l$ in said base. Operating beneath the lower opening of said duct is a transversely-reciprocating powder-slide L³, having a powder-measuring chamber $l'$ passing through it and sliding in suitable guides $l^2$, which are secured to the back clamp and cross-frame and cover the upper and lower surfaces of the slide. Openings $l^3$ and $l^4$ in the guides communicate with the duct $l$ and the shell, respectively, said two openings being located in different vertical planes, as illustrated. An oscillating arm L⁴ is keyed to a rock-shaft L⁵, Fig. II, operated by the cam L⁶, secured to the operating-shaft E, and the double arm L⁷, as shown in Fig. IV. The end of said arm L⁴ is connected, by means of link $l^5$, to the slide L³, Fig. XXXVII, the latter thus reciprocating in unison with the oscillating arm L⁴. At the free end of the said slide is formed a discharge-opening $l^6$, the distance between the measuring-chamber and said opening being greater than that of the normal travel of the slide, which is equal to the distance from center to center of openings $l^3$ and $l^4$, as a result of which it is seen that the said discharge-opening does not normally communicate with the powder-feed tube. When it is desired, however, to discharge the contents of the powder-reservoir, the link $l^5$ is disconnected from the arm L⁴, as shown in Fig. XXXVIII, and the slide pulled back, so as to bring the discharge-opening under the powder-opening $l^3$, a small chute $l^7$ having been first attached to the slide, as shown in Figs. XXXVII and XXXVIII. In order to facilitate the disconnection of the link, the latter is connected to a bearing $l^8$, having a transverse bore, Fig. XXXVII, through which extends a thumb-screw $l^9$, engaging the end of said link in a threaded bore. The conveyer next transfers the shell to the paper-wad-inserting device M, Fig. VII. A rammer $m$ is attached to the slide M', which is actuated by the cam M², secured to the operating-shaft E, and passes through die M³, provided with a transverse aperture $m^3$, through which the paper strip $m^2$ is fed. The construction of the punching device is preferably as described in my Patent No. 614,330, issued on November 15, 1898, in which the punch is shown as a hand-operated machine. In order to prevent the lower cutting edge from chafing the inside of the shell, the diameter of the lower portion of the rammer is slightly reduced, as shown in exaggerated form in Fig. XL. The wad-strip is fed into the punch by the feeding device N. This device consists of a main roll N', secured to an intermittently-rotating driving-shaft $n$, Fig. II, and a pressure-roll N², mounted upon the upper end of a rocker-arm N³. The lower end of said arm is provided with a spring-pressed bolt $n'$, which bears against the periphery of the main roll. The surface of the said roll is divided into two saw-tooth surfaces, as shown in Fig. XVII, with an intermediate groove $n^2$, which is formed at equal intervals with depressions $n^3$, the peripheral distance between such successive depressions being that through which the roll rotates to feed the strip for successive cuttings by the punch. These depressions are successively engaged by the end of the bolt and serve to punctuate the intervals through which the roll is rotated and to insure the same amount of rotation at each successive operation, as well as to prevent a variation of the travel which the momentum of the device tends to produce. Said main roll, as before mentioned, is mounted upon a shaft $n$, Fig. II. Said shaft is mounted in suitable bearings and is intermittently rotated by the device shown in Fig. XXXIX and which consists of a plate O, pivoted upon said shaft in the position shown in Fig. II and adjacent to a ratchet-wheel O', keyed thereto. A dog $o$, formed with a projecting lug $o'$, is pivoted to the lower end of the plate and is adapted to engage the teeth of the said ratchet-wheel. The lower end of a connecting-rod O² is pivoted upon said plate and is provided with a lug $o^2$. A spring $o^3$ is secured to and connects the said lugs $o'$ and $o^2$ and causes the dog $o$ to maintain its engaging position. By means of this arrangement a greater tension is produced in the spring by the recession of the lugs $o'$ and $o^2$ when the connecting-rod is depressed so as to enable the dog to engage the next ratchet-tooth, said increased tension insuring a firm hold on the part of the dog when such firmness is most essential—that is, at the beginning of the upward stroke. The connecting-rod O² derives its reciprocating motion from an arm $o^4$, secured to a rock-shaft P, Figs. II and IV, journaled in suitable bearings on the cross-frame and operated by the eccentric P' on the operating-shaft E. A suitable guide O³ is provided to conduct the punctured wad-strip from the machine, said guide being shown in cross-section in Fig. VII. The shell after having been supplied with a paper wad is conveyed to the felt-wad-inserting means R, Figs. VIII and XLI. These means consist of two separate but duplicate devices, one of which feeds and inserts one felt wad, whereupon the shell is conveyed to the second device, where the second wad is introduced, both devices being operated by the same operating-cam R' on shaft E. Two tubes R² R² extend upwardly from two curved and open spouts R³ R³, which discharge immediately in the rear and just above the shells as they stand in position to be supplied with the felt wads. These tubes are rectangular in cross-section, as shown in Fig. XLV, and the height of such section is somewhat greater than the thickness of the wads, while the width of said section is such as to permit the wads to easily pass through when laid therein in a column with their sides contiguous, as shown in Fig. XLIV. The lower ends of the tubes are removably secured to the spouts by means of clamps $r\ r$, Fig. XLI. Upon horizontal extensions $r'\ r'$, formed upon the end of each spout and extending out over the shell-conveyer, are pivoted two bell-crank levers R⁴ R⁴, each formed with a wad-receiving recess $r^2$ and an arresting-face $r^3$, which arrests the wad-column when the lever is in the position shown in Fig. XLI in dotted lines. The opposite end of each lever is engaged by an operating-lever R⁵, which is fulcrumed upon a suitable support secured to the cross-frame. The lever R⁵ is oscillated by said cam R', which contacts a suitable roller mounted upon the upper end of said lever. Oscillation of said lever R⁵ causes the levers R⁴ to oscillate. The action of the cam causes the oscillation of said lever R⁵, so that the lower end moves back and causes the levers R⁴ to open out and assume the position shown in Fig. XLI in full lines. On such opening the arresting-face is withdrawn from the mouth of the spout and the receiving-recess presented in place thereof. The wad-column thereupon moves down, pushing the end wad into the recess, the end wad traveling a distance greater than that of the diameter of a wad. The next wad is thereby partially interposed in the path of the arresting-face, and on the return of the lever, whereby the wad is transferred to the inserting position, the said face pushes the column of wads back up the tube a short distance, thereby causing a small amount of compression of the wads in the column. The wad on being so transferred is placed in a thimble $r^4$, in which the end of the lever enters by means of a slot $r^5$, cut through the side thereof, as shown in Fig. XLIII. Into these thimbles the rammers $R^6$ $R^6$ are caused to enter by the operation of the cams $R^7 R^7$ acting upon the slides $R^8 R^8$, thereby inserting the wads in the shells and withdrawing before the return of the transferring-levers. On the return of the levers to receive the next wads the elastic energy stored up in the wad-column due to the said compression is permitted to apply itself in the form of a downward movement to quickly shoot the lowermost wad into place in the receiving-recess. The frictional resistance of the wads in the tubes which would otherwise prevent the wad-column from moving downwardly with sufficient speed to properly feed into said lever is thus overcome and the correct introduction and transfer of the wad always assured. Strips $r^6 r^6$ are secured above the wad-column, as shown in Fig. XLI, to prevent the exposed portion of said column from buckling. This mode of construction permits of a greater speed than has heretofore been attained in loading machines feeding cut wads by the action of gravity alone. The movement of the levers in the transferring operation is derived from a spring-bolt $R^9$, mounted in a suitable barrel $R^6$, secured to or formed on the back clamps and which bears against the back of lever $R^5$. The shell is next conveyed to a second paper-wad-inserting device $M^4$, operating in a manner precisely similar to that of the paper-wad device M, the slide $M^5$ being operated by cam $M^6$, Fig. I, and the strip-feed roll $N^3$ being operated by the shaft $n$, Fig. II, the punctured wad-strip being led away through a guide $O^4$. The shell is next conveyed to the shot-loading device S, Fig. IX, which is constructed and operates precisely in the manner of the powder-loading device, S' being a shot-reservoir, and the slide deriving its reciprocating movement from the aforementioned rock-shaft $L^5$, with which latter it is connected by means of a rocking arm $S^2$. (Shown in Fig. II.) During the intervals of transfer from the shot-loading device to the third wad-inserting means $M^7$, to which the shell is next conveyed, a transversely-oscillating cover is superimposed upon the upper surface of the shell-conveyer to prevent the ejection of shot from the open end of the shell during such transfer. Said cover consists of a flat plate T, Figs. XI and $XI^b$, which slides in horizontal guides cut in the bottom of the shot-slide guide and the strip-guide casting $O^5$ of the third wad-inserting device $M^7$, said plate being pivoted upon the lower end of an oscillating arm T', whose upper end is journaled upon the cross-frame D. A roller $t$ is journaled upon a projecting support $t'$, formed upon the reciprocating slide $M^9$ of the said wad-inserter. Said roller travels in a cam-groove $t^2$, formed in the said arm T', so arranged that the said roller will cause the lower end of said arm to move toward the back of the machine from the uncovering position (shown in Fig. X) to the covering position. (Shown in Fig. XI.) The cams and other parts are adjusted so as to cause the movement at the proper time. A spring $t^3$ maintains the plate in a position parallel with the upper end of the shell when uncovered, whereby the said plate is caused always to move easily and without interference to its covering position. The wad-strip is fed through the third paper-wad punching and inserting device $M^7$ by a feeding-roll V, whose construction is the same as that of the feeding device N, previously described, Figs. VII and XVII, the device $M^7$ being operated by cam $M^{10}$. Said roll V is also operated by shaft $n$ and its intermittently-rotating means, the location of said roll being shown in Fig. II. A strip-guide $O^5$ is provided of same construction as guide $O^3$ and $O^4$. Directly behind said roll V is located a printing device W, through which the strip $m^7$ passes before being punched. Said printing device, for Letters Patent for which I intend to make separate application, is mounted upon a frame W', which is adjustable with reference to said punch by means of suitable screws $w$, and in operating the said device is so timed and the distance so adjusted that the printed matter will be located directly in the center of each punched paper wad—that is, one printing operation takes place for every punching operation—and the horizontal distance from the center of the punch to the center of the type in the machine while in the act of printing is made an exact multiple of the distance from center to center of two adjacent apertures in the punched wad-strip. The shells are next conveyed to the crimper Y, Fig. XII, which is rotated by a belt passing around the pulley Y', the idler $Y^3$, and the driving-pulley $Y^2$. The crimper-spindle $y$ is splined in the hollow shaft of the pulley Y, so that it may be vertically reciprocated during its rotation, and said pulley-shaft is journaled in a bearing $y'$, secured to the cross-frame D. A spring $y^2$ urges the crimping-spindle $y$ in an upward direction. The upper end of said spindle bears and rotates against the lower end of a lever $y^3$, fulcrumed on the slide $Y^4$, which is reciprocated by cam $Y^5$, which may be thrown out of engagement with said spindle by means of the handle $y^4$, as shown in dotted lines, Fig. XII. When said lever is so disengaged, the spring $y^2$ urges the spindle upwardly and the crimping-tool is disengaged from the shell. The crimper may hence be rendered inoperative during the operation of the machine, which is sometimes desirable. In order that the crimper-tool may reach and surround the shell end, the shell-clamps are countersunk, as shown in Fig. XIX at $y^5$. An adjustable threaded point $y^6$ projects a short distance into the lower portion of the shell-space of the clamps, as shown in Fig. XII, and prevents the rotation of the shell during the operation thereon of the crimper. The shell is finally conveyed to the ejector G, which comprises the slide G', operated by the cam $G^2$, Fig. XIII, and the ejecting-tool $G^3$ attached to said slide. When the shell is placed in position under the ejector by the shell-conveyer, the ejecting-tool descends and ejects it from the shell-clamps in case it be accidentally held at this point. The shells completely loaded drop into a discharge-tube Z, from which they are received in any suitable manner.

Other modes of applying the principle of my invention may be employed instead of the one explained, change being made as regards the mechanism herein disclosed, provided the means covered by any one of the following claims be employed.

I therefore particularly point out and distinctly claim as my invention—

1. In a shell-loading machine the combination of operating mechanism, a shell-carrier, means for operating said carrier, the latter having separable engagement with its operating means whereby its position relatively to said operating means may be changed from the normal, and means for rendering said driving means inoperative during a change of such relation between said carrier and its operating means, substantially as set forth.

2. In a shell-loading machine, the combination of operating mechanism, a reciprocating shell-carrier, means for advancing and means for returning said carrier, the latter having separable connection with said returning means whereby its position relatively to the operating mechanism may be changed from the normal during the advance of the carrier, driving means and means connected with the carrier for disconnecting said driving means from the operating mechanism during the advance of said carrier, substantially as set forth.

3. In a shell-loading machine, the combination of operating mechanism, a shell-carrier, means for reciprocating said carrier, the latter having separable engagement with its reciprocating means, driving means disconnectably engaging the operating mechanism, and reciprocating means connected with said carrier for disconnecting said driving means from said operating mechanism, the path of said reciprocating means intersecting the path of the means connecting the driving means and operating mechanism, substantially as set forth.

4. In a shell-loading machine, the combination of operating mechanism, a shell-carrier, means for reciprocating said carrier, the latter capable of alteration of its position relatively to the operating mechanism, driving means connected with said operating mechanism and capable of disconnection therefrom, and reciprocating means connected with said carrier, the path of said latter reciprocating means intersecting that of the means for connecting the driving means and operating mechanism at all points excepting at the end of the advance movement of the carrier, substantially as set forth.

5. In a shell-loading machine the combination of a driving-pulley and operating-shaft, means for operatively connecting said pulley and shaft, a shell-carrier, means for operating said carrier, and means connected with said carrier for disconnecting said pulley and shaft, substantially as set forth.

6. In a shell-loading machine, the combination of an operating-shaft, a driving-pulley loosely mounted upon said shaft, an arm secured to said shaft, means for engaging the end of said arm with said pulley, a shell-carrier, suitable means for operating said carrier, and means connected with the latter for actuating the arm and pulley-engaging means to disconnect the arm from the pulley, substantially as set forth.

7. In a shell-loading machine, the combination of an operating-shaft, a driving-pulley loosely mounted upon said shaft, an arm secured to the latter, means for engaging said arm and said pulley, a shell-carrier, suitable means for operating said carrier, and means for disconnecting said arm and pulley, said means interposed in the path of the arm and pulley-engaging means and connected with the shell-carrier, substantially as set forth.

8. In a shell-loading machine, the combination of an operating-shaft having an arm secured thereto, a pulley loosely mounted upon said shaft, a member pivoted upon said arm and adapted to engage the pulley, a shell-carrier, means for operating same, and means connected with said carrier and operating in unison therewith, for engaging said pivoted member and disconnecting the pulley and arm, substantially as set forth.

9. In a shell-loading machine, the combination of an operating-shaft having an arm secured thereto, a pulley loosely mounted upon said shaft, a trip member pivoted upon said arm and engaging a shoulder formed on said pulley, a shell-carrier, means for operating same, said carrier capable of displacement relatively to its operating means, a reciprocating trip member connected with said carrier, operating in unison therewith and normally projecting into the plane of said first trip member excepting when in the same longitudinal vertical plane and on the same side of the driver center therewith, substantially as set forth.

10. In a shell-loading machine, the combination of a loading-tool, mechanism for operating same, a shell-carrier and shell-support, and means for operating said carrier, said support provided with means for securing the end of an inverted shell and said carrier adapted to secure the opposite end of said shell on the operation of said loading-tool upon such shell, substantially as set forth.

11. In a shell-loading machine, the combination of a loading-tool, mechanism for operating same, a shell-carrier and shell-support, and means for operating said carrier, said support provided with an aperture and means for securing the end of an inverted shell in said aperture on the operation of said loading-tool upon such shell, substantially as set forth.

12. In a shell-loading machine, the combination of a loading-tool, mechanism for operating same, a shell-carrier and a shell-support, means for operating said carrier, said support provided with an aperture, and a plug for securing the end of an inverted shell in said aperture upon the downward movement of said loading-tool upon such shell, substantially as set forth.

13. In a shell-loading machine, the combination of operating mechanism, a loading-tool, a shell-carrier, a shell-support having a conical opening for receiving the open end of a shell, and a plug for securing said end in said opening, and for preventing the operation of the carrier, substantially as set forth.

14. In a shell-loading machine, the combination of driving means, a series of loading devices, a shell-carrier for subjecting the shells successively to the operation of said devices, mechanism for operating the latter and the carrier, trip mechanism for disconnecting the driving means from the loading-device-operating mechanism, means for securing the open end of an inverted shell while held in said carrier, whereby the movement of the latter is interrupted and said trip mechanism rendered operative, substantially as set forth.

15. In a shell-loading machine, the combination with wad-feeding means for feeding the wads in a column with their curved sides contiguous, of wad-transferring means, said means adapted to compress the wad-column, substantially as set forth.

16. In a shell-loading machine, the combination with a tube for feeding wads in a column, of a lever vibrating at the end of said tube and provided with a receiving-recess and an arresting-face on said lever and adjacent to said recess, the latter being of a depth such that the wads in entering travel a distance greater than the wad diameter, whereby said wad-column is compressed by said arresting-face, substantially as set forth.

17. In a shell-loading machine, the combination of a paper-punch, strip-feeding means, and a printing device for automatically printing upon the strip before the operation of the punch thereon, substantially as set forth.

18. In a shell-loading machine, the combination of a paper-punch, strip-feeding means and a printing device for printing upon the strip before the operation of the punch thereon, said printing device adjustable longitudinally relatively to said punch, substantially as set forth.

19. In a shell-loading machine, the combination of a driven feed-roll, a rocker-arm and a compression-roll mounted upon said arm, the latter bearing upon said driven roll, substantially as set forth.

20. In a shell-loading machine, the combination of a driven feed-roll, a rocker-arm and a compression-roll mounted upon said arm, the latter provided with a spring-pressed bolt bearing upon said driven roll and adapted to press the compression-roll thereon, substantially as set forth.

21. In a shell-loading machine, the combination of a driven feed-roll provided with peripheral indentations, a rocker-arm, and a compression-roll mounted upon one end of said arm, the other end of the latter adapted to engage said indentations, substantially as set forth.

22. In a shell-loading machine, the combination of a driven feed-roll provided with peripheral indentations, a rocker-arm, and a compression-roll mounted upon one end of said arm, the other end of the latter provided with a spring-pressed bolt adapted to engage said indentations, substantially as set forth.

23. In a shell-loading machine, the combination of a shell-carrier, means for operating same, means for loading shell with shot, means for inserting a wad upon such shot, a movable covering-plate, and means for moving said plate to cover such shell during its transfer from said shot-loading to said wad-inserting means, substantially as set forth.

Signed by me this 14th day of January, 1899.

WILLIAM L. MORRIS.

Attest:
D. T. DAVIES,
A. E. MERKEL.